3,711,442
POLYMERS WITH SILYLUREA UNITS WHICH CAN BE CONVERTED INTO POLYUREA ELASTOMERS
Marcel Lefort, Caluire, and Jean Robin, Lyon, France, assignors to Rhone-Poulenc S.A., Paris, France
No Drawing. Filed May 28, 1970, Ser. No. 41,624
Claims priority, application France, May 29, 1969, 6917558
Int. Cl. C08g 22/02, 22/16
U.S. Cl. 260—75 NH          13 Claims

ABSTRACT OF THE DISCLOSURE

Polysilylureas having repeat units of general formula:

and

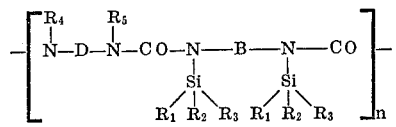

wherein $n$ and $m$ are 20–400, A, B and D are divalent aliphatic or aromatic radicals, $R_1$, $R_2$ and $R_3$ are alkyl and $R_4$ and $R_5$ are alkyl or together are alkylene; are prepared by reacting $A(OH)_2$ with an excess of OCN—B—NCO to give a prepolymer which is reacted under anhydrous conditions with an N,N'-bis-triorganosilyl diamine

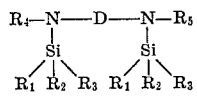

The polysilylureas are soluble in organic solvents and are formed into films or filaments and hydrolysed to corresponding polyureas.

---

The present invention relates to new silylurea polymers, their production and their conversion into elastomers, particularly elastomeric filaments and films.

It is known that prepolymers of polyurethanes with terminal isocyanate groups, which are generally obtained by the action of one mol. of a macrodiol on more than one mol. of a diisocyanate, can be coupled by means of difunctional compounds containing active hydrogen atoms, such as diamines, glycols, aminoalcohols or dihydrazides. In particular, the polyureas resulting from the coupling of a diamine with a prepolymer having terminal isocyanate groups are elastomers, the properties of which vary, depending on the nature of the macrodiol, the diamine and the diisocyanate. In numerous cases, these elastomers are insoluble in polar solvents which makes conversion into filaments and films practically impossible and therefore, such elastomers have not hitherto been applied industrially. Where the elastomers are soluble in polar solvents, they have relatively low tack points, which causes a loss of their elastic properties during spinning operations. In accordance with the present invention, new silylurea polymers have been found which, by virtue of their solubility in solvents, can be easily converted into filaments and films. The polysilylureas can be converted, under the influence of water in the liquid state or in the vapour state, into polyureas which are elastomeric and which are insoluble in polar solvents and if the silylurea polymer is converted into a filament or film before conversion to the polyurea, elastomeric polyurea filaments or films can be obtained which are insoluble in polar solvents and which have a high tack point.

The silylurea polymers essentially have repeat units of the general formula:

and

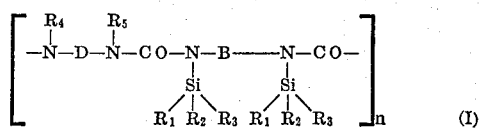 (I)

wherein $n$ and $m$ represent integers of 20 to 400; A represents a divalent radical of molecular weight 400 to 5,000 comprising alkylene, cycloalkylene or arylene radicals which may be interrupted by one or more —O—, —COO—, —CONH—, —NHCOO— radicals; B and D, which may be the same or different, each represent a divalent radical having 2 to 20 carbon atoms comprising alkylene, cycloalkylene or arylene radicals which may be interrupted by one or more —O—, —S—, COO—, —CONH—, —NHCOO or —NHCOS radicals; $R_1$, $R_2$ and $R_3$, which may be the same or different, each represent a monovalent hydrocarbon radical and $R_4$ and $R_5$, which may be the same or different, each represent hydrogen or a monovalent hydrocarbon radical or together represent a divalent hydrocarbon radical.

The polymers of general Formula I may be obtained by reacting, in a first stage, one mol. of a macrodiol $A(OH)_2$ with more than one mol. of a diisocyanate

OCN—B—NCO and then reacting the resulting prepolymer with a N,N'-bis(triorganosilyl)diamine of general formula:

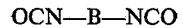
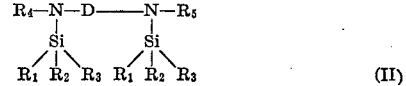 (II)

in which the symbols $R_1$, $R_2$, $R_3$, $R_4$, $R_5$ and D are as defined above.

The macrodiol $A(OH)_2$ will have a molecular weight of about 400–5,000 and is preferably 1,400–3,500; its melting point is preferably less than 80° C. The macrodiols can be a polyester of acid number less than 10. Such polyesters can be obtained by reacting one or more dicarboxylic acids with a suitable molar excess of one or more dialcohols. Acids which may be used include aliphatic acids such as succinic acid, glutaric acid, adipic acid, pimelic acid, suberic acid, azelaic acid or sebacic acid; cycloaliphatic diacids such as 1,4-cyclohexanedicarboxylic acid; and aromatic acids such as phthalic, isophthalic and terephthalic acids. Suitable dialcohols include: 1,2-ethanediol, 1,2- and 1,3-propanediol, 1,2- 1,3- and 1,4-butanediol, 1,5-pentanediol, 1,6-hexanediol, 1,10-decanediol and 2,2-dimethyl-1,3-propanediol. Another method of producing α,ω-dihydroxy polyesters consists of subjecting lactones to polycondensation in the presence of dialcohols.

The macrodiol $A(OH)_2$ can also be an α,ω-dihydroxy linear polyether which can be obtained by polycondensation of an alkylene oxide such as ethylene oxide or propylene oxide or of cyclic ether such as tetrahydrofuran in the presence of water, or a dialcohol or diamine.

It is also possible to use, as macrodiol $A(OH)_2$, an α,ω-dihydroxy polyester-amide, α,ω-dihydroxy polyurethane or α,ω-dihydroxy hydrocarbon such as α,ω-dihydroxy polybutadiene or α,ω-dihydroxy butadiene-isobutylene copolymer.

The radical B of the diisocyanate OCN—B—NCO, which may or may not be substituted, may contain alkylene units, cycloalkylene units with 5 or 6 nuclear carbon atoms or phenylene units. These units can be linked to one another through divalent hetero-atom units such as —O— or —S—, —NHCOO— and —NHCOS—. The urethane and thiourethane units can for example, be obtained following reaction of one molecule of a diol or of a dithiol with two molecules of diisocyanate. Suitable diisocyanates OCN—B—NCO include the following: hexamethylenediisocyanate, para - phenylenediisocyanate, 1,4 - cyclohexylenediisocyanate, 4,4' - bis - diisocyanatodiphenylmethane and 4,4'-bis-diisocyanatodiphenyl-ether.

The symbols $R_1$, $R_2$ and $R_3$ may represent branched or unbranched alkyl radicals having 1 to 6 carbon atoms, or cycloalkyl, phenylalkyl or alkylphenyl radicals. The hydrocarbon radicals represented by $R_4$ and $R_5$ may be branched or unbranched alkyl radicals having 1 to 6 carbon atoms, cycloalkyl radicals having 5 to 6 nuclear carbon atoms, alkylphenyl radicals or phenylalkyl radicals or together may represent a —$CH_2$—$CH_2$— radical.

Suitable bis(triorganosilyl)diamines of general Formula II include the following:

N,N'-bis(trimethylsilyl)-1,4-butanediamine,
N,N'-bis(trimethylsilyl)-1,6-hexanediamine,
N,N'-bis(triphenylsilyl)-1,4-butanediamine,
N,N'-bis(trimethylsilyl)-1,4-diaminocyclohexane,
N,N'-bis(trimethylsilyl)-p-phenylenediamine,
N,N'-bis(trimethylsilyl)-4,4'-diaminodiphenyl-ether and
N,N'-bis(trimethylsilyl)piperazine.

The bis(triorganosilyl)diamines of Formula II can be obtained by reacting a secondary or primary diamine with a triorganochlorosilane, for example a trialkylchlorosilane such as trimethylchlorosilane.

The prepolymer with terminal isocyanate groups can be prepared by reacting the macrodiol with the diisocyanate in amounts such that there is more than one isocyanate group per hydroxy group. Whilst a large excess could be used, the quantities usually employed are such that the ratio NCO/OH is between 1.05 and 3. The reaction is effected at a temperature not exceeding 150° C. and preferably in the presence of an inert and anhydrous solvent such as toluene. The diisocyanate is generally added to the macrodiol all at once at the start of the process; it is also possible initially only to use part of the total amount of diisocyanate if the latter is such that the ratio NCO/OH is greater than 1.5, and to add the rest of the diisocyanate while the mixture is being heated. This latter method of operation makes it possible in certain cases to improve the properties of the elastomer and especially to reduce the residual elongations.

The reaction between the prepolymer with terminal isocyanate groups and the N,N'-bis(triorganosilyl)diamine of Formula II is effected by adding the diamine to the prepolymer, or vice versa, in an anhydrous atmosphere. The diamine of Formula II is preferably employed in the form of a solution in a solvent which is inert under the working conditions and the reaction may be carried out in the presence of a solvent for the final polymer, preferably at a temperature of about 20° C. The solvents for the final polymer may be dimethylformamide, tetramethylurea, N-methylpyrrolidone, dimethylsulphoxide or tris-(dimethylamino)phosphine oxide.

The amount of N,N'-bis(triorganosilyl)diamine introduced should provide a number of silylamine groups corresponding to about 100 to 105% of the number of isocyanate groups on the prepolymer.

The resulting solutions of polysilylurea, of Formula I, can be used to form filaments and films. These conversions must be carried out in an anhydrous atmosphere so as to avoid the hydrolysis of the polysilylureas.

When the filaments and films of the polysilylurea are exposed to hydrolysis, polyurea filaments and films are obtained which contain fewer silyl groups than the initial polysilylurea. Polyureas totally devoid of silyl groupings can be obtained by means of an appropriate hydrolysis treatment. The hydrolysis can be carried out by bringing together the polysilylurea and water in the liquid state or in the vapour state. Thus, simple exposure to moist air suffices to bring about the hydrolysis.

During the hydrolysis of the silyl groupings, disiloxanes are formed and a hydrogen atom is substituted for the triorganosilyl grouping carried by the nitrogen atom. The polyureas thus have repeat units of the general formula:

and

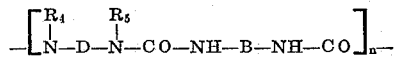

After hydrolysis, the polyurea filaments and films can first be washed with water so as to remove the disiloxane compounds. It is also possible to remove the disiloxanes by heating the polyurea filaments and films to a temperature which allows the siloxane compound to evaporate.

The polyurea filaments and films obtained after hydrolysis are elastomeric and generally insoluble in polar organic solvents.

The examples which follow illustrate the invention.

EXAMPLE 1

108.9 g. of a polyester of molecular weight 1815, obtained by esterification of adipic acid with a mixture of hexanediol and γ-neopentylglycol, and 98.3 g. of toluene are introduced into a 300 ml. reaction flask. The mixture is heated to 130° C. and 68.6 g. of toluene distil off. Thereafter, 22 g. of 4,4'-diisocyanato-dicyclohexylmethane and 56.6 g. of distilled toluene are added to the polyester. The mixture is heated for 1 hour 30 minutes with the toluene refluxing (119° C.) and a toluene solution of prepolymer is obtained. A further 9.45 g. of 4,4'-diisocyanato-dicyclohexylmethane and 12 g. of toluene are added and the mixture is heated for 30 minutes to 118–119° C. It is then cooled, and a prepolymer containing 0.0488 mol. of isocyanate grouping per 100 g. is obtained.

30 g. of the prepolymer solution, 79.5 g. of dimethylformamide and 1.684 g. of N,N'-bis(trimethylsilyl)piperazine are introduced into a 250 ml. reactor, with exclusion of moisture. The reagents are stirred for 1 hour and a fluid limpid solution having an absolute viscosity of 2 poises is obtained. It is found that if a sample of this solution is brought into contact with moist air, it sets solid immediately. The remainder of the solution is used to produce a film: the solution is cast onto a glass plate at a thickness of 0.5 mm. at 25° C., in an anhydrous atmosphere, and then heated to 120° C., for 2 hours in a ventilated oven. During the oven treatment, the hydrolysis of the silylurea groupings takes place completely.

The film with polyurea groupings so obtained has the following properties:

tensile strength: 487 kg./cm.$^2$ (at 25° C.)
elongation at break: 666%
delayed residual elongation during 30 seconds following:
  300% elongation: 24%
tack point: above 270° C.

The film is insoluble in polar solvents such as dimethylformamide, dimethylacetamide and dimethylsulphoxide.

Coupling the prepolymer with piperazine in a polar solvent medium, without going via the silyl derivative, immediately leads to an insoluble heterogeneous mass which cannot be converted into films or into filaments.

EXAMPLE 2

A solution of prepolymer with terminal NCO groupings is prepared in the same manner as in Example 1. This prepolymer contains 0.0469 mol. of NCO grouping per 100 g. of prepolymer solution.

1.829 g. of N,N'-bis(trimethylsilyl)-1,6-hexanediamine and 79.5 g. of dimethylformamide are introduced into a 250 ml. reactor. The mixture is stirred under a stream of dry nitrogen and 31.6 g. of the prepolymer solution is gradually run in over the course of 1 hour 30 minutes. The polymer solution so obtained has a concentration of 17.4%. It is limpid, and its absolute viscosity is 5 poises. A film is prepared with this solution and hydrolysed as in Example 1. The hydrolysed film has the following properties:

tensile strength (at 25° C.): 550 kg./cm.$^2$
elongation at break: 569%
delayed residual elongation during 30 seconds following 300% elongation: 14%
tack point: 230° C.

This film is insoluble in dimethylformamide, dimethylacetamide, dimethylsulphoxide, hexamethylphosphotriamide and N-methylpyrrolidone.

The direct reaction of the prepolymer with the hexamethylenediamine in a polar solvent medium immediately leads to an insoluble heterogeneous mass which cannot be converted into films or filaments.

EXAMPLE 3

181.5 g. of a polyester of molecular weight 1815, obtained by esterification of adipic acid with a mixture of hexanediol and γ-neopentylglycol, are introduced into a 500 ml. reactor and heated to 130° C. over the course of 30 minutes under a pressure of 2 to 3 mm. of mercury. The polyester is then cooled to about 110° C., 37.05 g. of 4,4'-diisocyanato-dicyclohexylmethane are added, and the mixture stirred at 115° C. for 2 hours 30 minutes. The content of NCO grouping is then 0.382 mol. per 100 g. of the mixture. The heating is stopped, 164 g. of dimethylformamide and 15.84 g. of 4,4'-diisocyanato-dicyclohexylmethane are added, and the reaction medium is homogenised and cooled. A prepolymer solution is obtained, having a concentration of 58.8% in dimethylformamide. This solution contains 0.0513 mol. of NCO grouping per 100 g.

5.669 g. of N,N'-bis(trimethylsilyl)-1,6-hexanediamine and 132 g. of dimethylformamide are introduced into a 250 ml. reactor, the process being carried out in the absence of moisture, and after homogenisation of the solution, 85 g. of the prepolymer solution prepared above are run in over a period of 37 minutes. The solution obtained is introduced into a spinning cell, with exclusion of moisture. This solution is then wet-spun into a bath containing a mixture of water and dimethylformamide (80:20 by volume). The filament obtained has the following properties:

gauge (in dTex): 125
elongation at break: 615%
tensile strength: 0.46 g./dTex
delayed residual elongation during 30 seconds following 300% elongation: 18%.

This filament is insoluble in dimethylformamide, dimethylacetamide, dimethylsulphoxide, hexamethylphosphotriamide, and N-methylpyrrolidone.

EXAMPLE 4

108.9 g. of a hexanediol/neopentylglycol polyadipate of molecular weight 1815 and 90.5 g. of distilled toluene are introduced into a 300 ml. reactor. 50.9 g. of toluene are distilled off by heating the reaction mixture to 130° C. 20.4 g. of 1,6-diisocyanatohexane and 50.9 g. of toluene are added and the mixture is heated for 1 hour 15 minutes with the toluene refluxing. After cooling, a prepolymer solution containing 0.0530 mol. of NCO grouping per 100 g. of solution is obtained.

2.067 g. of N,N-bis(trimethylsilyl)-1,6-hexanediamine and 79.5 g. of dimethylformamide are introduced into a 250 ml. reactor and 30 g. of the prepolymer solution prepared beforehand are run into the homogenised solution over the course of 1 hour 10 minutes. A film is produced from this solution and hydrolysed as in Example 1. The hydrolysed film has the following properties:

tensile strength at 25° C.: 546 kg./cm.$^2$
elongation at break: 852%
delayed residual elongation during 30 seconds following 300% elongation: 49%
tack point: 220° C.

This film is insoluble in polar solvents.

EXAMPLE 5

A prepolymer solution is prepared using the same amounts of reagents and the same method of working as in Example 3. The prepolymer solution contains 0.0527 mol. of NCO grouping per 100 g. of solution.

1.818 g. of N,N'-bis(trimethylsilyl)piperazine and 79.5 g. of dimethylformamide are introduced into a 250 ml. reactor. 30 g. of the prepolymer solution are run in over a period of 36 minutes while the mixture is stirred, the process being carried out in an anhydrous medium. A limpid and very fluid solution is obtained, from which a film is prepared and hydrolysed as in Example 1. The hydrolysed film has the following properties:

tensile strength (at 25° C.): 148 kg./cm.$^2$
elongation at break (at 25° C.): 780%
delayed residual elongation during 30 seconds following 300% elongation: 16%
tack point: 216° C.

This film is insoluble in polar solvents.

EXAMPLE 6

93.3 g. of polyester of molecular weight 933, obtained by esterification of adipic acid with a mixture of ethylene glycol and propylene glycol, and 100.3 g. of distilled toluene are introduced into a 300 ml. reactor. 66.4 g. of toluene are distilled off by heating the reaction mixture to 130° C. After cooling the polyester to 80° C., 50 g. of 4,4'-diisocyanato-diphenylmethane and 66.4 g. of anhydrous toluene are added and the mixture is heated and stirred at 80° C. for 2 hours 30 minutes. A prepolymer solution containing 0.0850 mol. of NCO grouping per 100 g. of solution is obtained.

3,213 g. of N,N'-bis(trimethylsilyl)-p-phenylenediamine and 87 g. of dimethylformamide are introduced into a 250 ml. reactor and 30 g. of the previously prepared prepolymer solution are run in over the course of 1 hour during which period the mixture is stirred and kept under a stream of dry nitrogen. A polymer solution of 17.4% concentration is obtained. The solution is yellow, limpid and very fluid and a film was prepared from it and hydrolysed by the method described in Example 1. The hydrolysed film has the following properties:

tensile strength (25° C.): 463 kg./cm.$^2$
elongation at break (25° C.): 294%
tack point: above 270° C.

EXAMPLE 7

121.2 g. of polytetrahydrofurane

(molecular weight 2020) and 107 g. of anhydrous toluene are mixed in a 300 ml. reactor and the mixture heated to 132° C. until 69.6 g. of toluene are distilled off.

31.75 g. of 4,4'-diisocyanato-dicyclohexylmethane and 69.6 g. of toluene are then added to the polyether and the mixture is heated to 120° C. for 4 hours. After cooling, a prepolymer solution is obtained which contains 0.0525 mol. of NCO grouping per 100 g. of solution.

108 g. of dimethylformamide are weighed into a 250 ml. reactor and 2.730 g. of N,N'-bis(trimethylsilyl)-1,6-hexanediamine are added. The mixture is stirred under a stream of dry nitrogen and 41 g. of the previously prepared prepolymer solution are run in over the course of 15 minutes. A solution of polysilylurea is obtained, from which an elastomeric film with polyurea units is prepared by the method described in Example 1. The hydrolysed film has the following properties:

tensile strength: 183 kg./cm.²
elongation at break: 765%
delayed residual elongation during 30 seconds following 300% elongation: 36%
tack point: 188° C.

We claim:

1. Elastomeric silylurea polymers which are soluble in polar solvents having 20–400 units of the general formula

and 20–400 units of the general formula

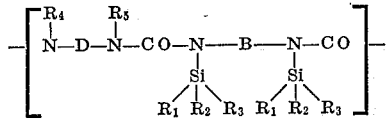

wherein A represents a divalent radical of molecular weight 400 to 5,000 comprising alkylene, cycloalkylene or arylene radicals which may be interrupted by one or more —O—, —COO—, —CONH—, —NHCOO— radicals; B and D, which may be the same or different, each represent a divalent radical having 2 to 20 carbon atoms comprising alkylene, cycloalkylene or arylene radicals which may be interrupted by one or more —O—, —S—, —COO—, —CONH—, —NHCOO— or —NHCOS— radicals; $R_1$, $R_2$ and $R_3$, which may be the same or different, each represent a monovalent hydrocarbon radical and $R_4$ and $R_5$, which may be the same or different, each represent hydrogen or a monovalent hydrocarbon radical or together represent a divalent hydrocarbon radical, the ratio of the number of groups B to the number of groups A being 1.05:1 to 3:1 and the ratio of the number of groups D to the difference between the number of Groups B and the number of groups A being 1:1 to 1.05:1.

2. A polymer according to claim 1 wherein

is the residue of a macrodiol $A(OH)_2$ after the removal of the active hydrogen atoms and wherein $A(OH)_2$ is a macrodiol having a molecular weight of 1,400 to 3,500.

3. A polymer according to claim 1 wherein

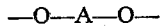

is the residue of a macrodiol $A(OH)_2$ after the removal of the active hydrogen atoms and wherein $A(OH)_2$ is a macrodiol having a melting point less than 80° C.

4. A polymer according to claim 1 wherein

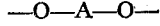

is the residue of a marcodiol $A(OH)_2$ after the removal of the active hydrogen atoms and wherein $A(OH)_2$ is a macrodiol which is a polyester of acid number less than 10.

5. A polymer according to claim 4 wherein the polyester is the reaction product of a dicarboxylic acid with an aliphatic diol.

6. A polymer according to claim 1 wherein

is the residue of a macrodiol $A(OH)_2$ after the removal of the active hydrogen atoms and wherein $A(OH)_2$ is an α,ω-dihydroxy linear polyether.

7. A polymer according to claim 1 wherein the radical B is an alkylene, cycloalkylene containing 5 to 6 ring carbon atoms or a phenylene group.

8. A polymer according to claim 1 wherein the radicals $R_1$, $R_2$, $R_3$, $R_4$ and $R_5$ each represent a branched or unbranched alkyl radical containing 1 to 6 carbon atoms or a cycloalkyl radical containing 5 or 6 ring carbon atoms or an alkylphenyl or phenylalkyl radical or $R_4$ and $R_5$ together represent a —$CH_2$—$CH_2$— radical.

9. A polymer according to claim 1 wherein A is derived from a macrodiol $A(OH)_2$ which is a polyester of molecular weight about 1815 obtained by esterification of adipic acid with a mixture of hexane diol and γ-neopentyl glycol or a polyester of molecular weight about 933 obtained by esterification of adipic acid with a mixture of ethylene glycol and propylene glycol or a polyether of formula $HO(CH_2CH_2CH_2CH_2O)_nH$ of molecular weight about 2020, wherein B is a

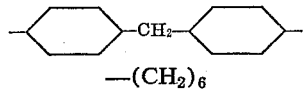

or     —$(CH_2)_6$— or

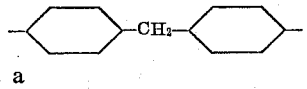

wherein D is a

—$(CH_2)_6$— or

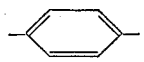

group; wherein $R_4$ and $R_5$ are hydrogen or wherein

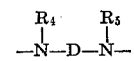

represents a

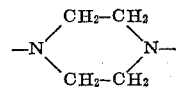

group; and wherein $R_1$, $R_2$ and $R_3$ each is a methyl group.

10. A process for the production of a polyurea elastomer having 20–400 units of the general formula:

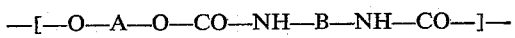

and 20–400 units of the general formula

where A, B, D, $R_4$ and $R_5$ are as defined in claim 1 and the ratio of the number of groups B to the number of groups A is 1.05:1 to 3:1 and the ratio of the number of groups D to the difference between the number of groups B and the number of groups A is 1:1 to 1.05:1 which comprises reacting a prepolymer formed by the reaction of one mole of a macrodiol $A(OH)_2$ with 1.05 to 3 moles of a diisocyanate of the formula

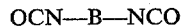

in an anhydrous atmosphere with an amount of an N,N'-bis-triorganosilyl diamine of the general formula

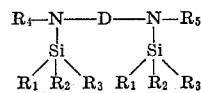

where D, $R_1$, $R_2$, $R_3$, $R_4$ and $R_5$ are as defined in claim 1, such that the number of silylamine groups is 1 to 1.05 times the number of isocyanate groups on the prepolymer and subjectingt he reaction product to the action of liquid water or water vapour.

11. A process according to claim 10 wherein the prepolymer is prepared by reaction at a temperature not exceeding 150° C. in the presence of an inert anhydrous solvent.

12. A process according to claim 10 wherein only a portion of the diisocyanate is mixed with the macrodiol initially, the mixture is heated and the remainder of the diisocyanate is introduced into the mixture during the heating of the mixture.

13. A process according to claim 10 wherein the N,N'-bis-triorganosilyldiamine is introduced as a solution in a solvent and the reaction is carried out at about 20° C.

References Cited

UNITED STATES PATENTS

| | | | |
|---|---|---|---|
| 2,723,987 | 11/1955 | Speier | 260—448.2 |
| 3,146,250 | 8/1964 | Speier | 260—448.2 |
| 3,338,144 | 6/1968 | Musolf et al | 260—448.8 |
| 3,309,261 | 3/1967 | Schiller et al. | 161—190 |
| 3,399,247 | 8/1968 | Windemuth et al. | 260—824 |
| 3,475,377 | 10/1969 | Rosendahl et al. | 260—75 |
| 3,542,836 | 11/1970 | Adams | 260—448.2 |
| 3,562,353 | 2/1971 | Chow et al. | 260—824 |
| 3,172,874 | 3/1965 | Klebe | 260—77.5 |
| 3,248,373 | 4/1966 | Barringer | 260—77.5 |
| 3,309,261 | 3/1967 | Schiller et al. | 161—190 |
| 3,632,557 | 1/1972 | Brode et al. | 260—77.5 |

DONALD E. CZAJA, Primary Examiner

H. S. COCKERAM, Assistant Examiner

U.S. Cl. X.R.

260—2 S, 46.5 E, 77.5 AM, 77.5 CH